Figure 1:
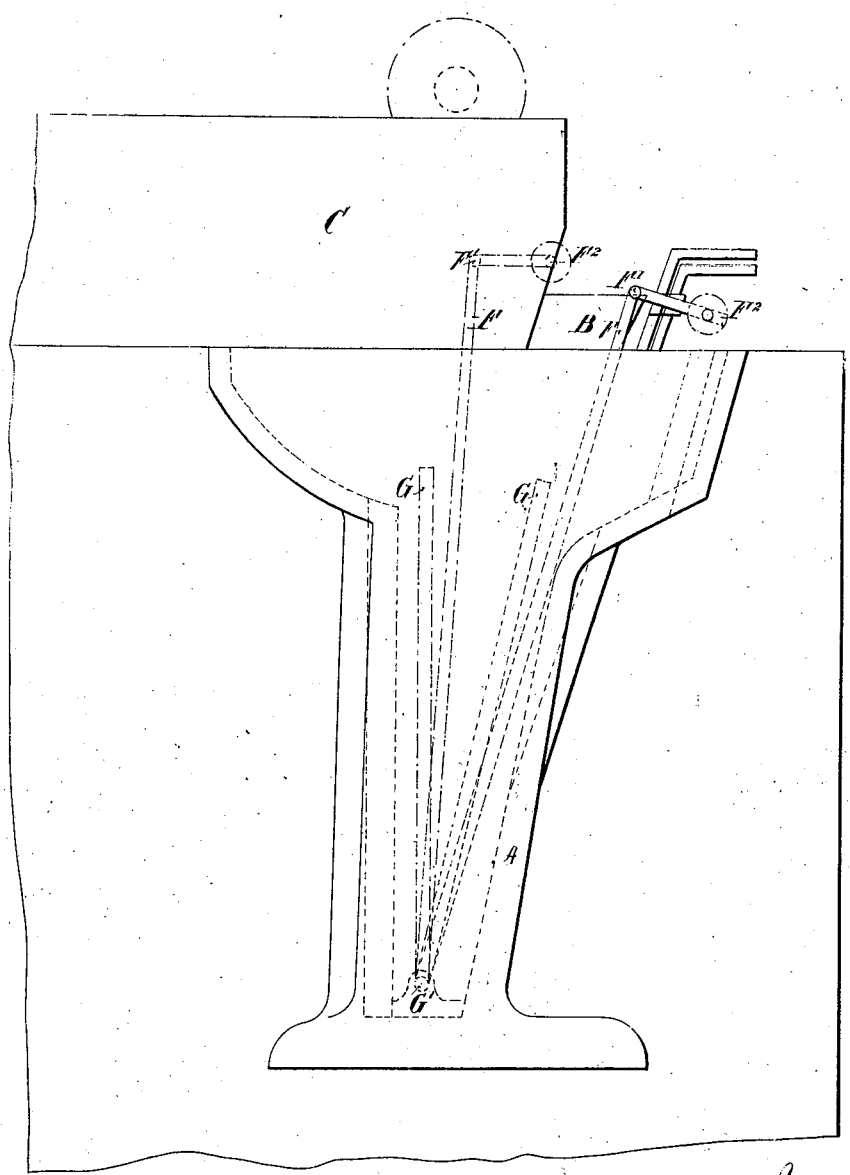

(No Model.) 6 Sheets—Sheet 1.

H. F. TAYLOR & G. LEYSHON.
APPARATUS FOR COATING METAL PLATES.

No. 329,240. Patented Oct. 27, 1885.

FIG: 1.

(No Model.) 6 Sheets—Sheet 4.
H. F. TAYLOR & G. LEYSHON.
APPARATUS FOR COATING METAL PLATES.
No. 329,240. Patented Oct. 27, 1885.
FIG. 4
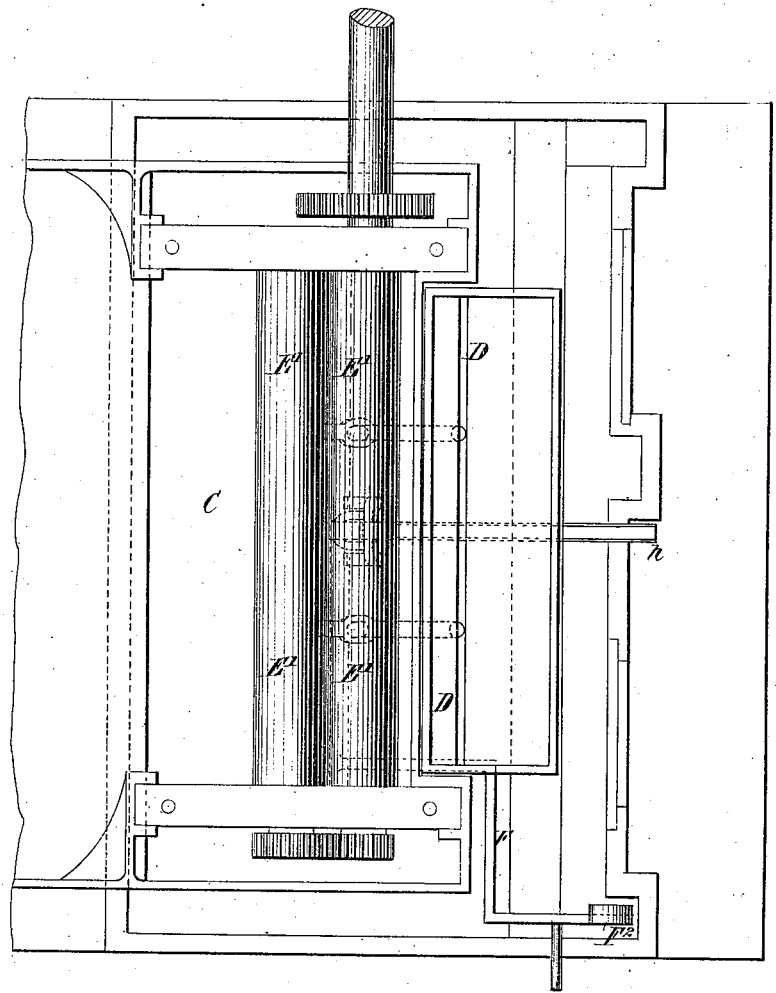
FIG. 5. FIG. 7. FIG. 6
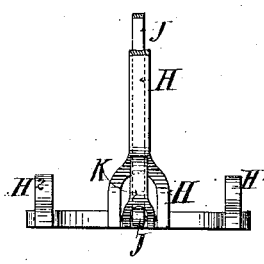
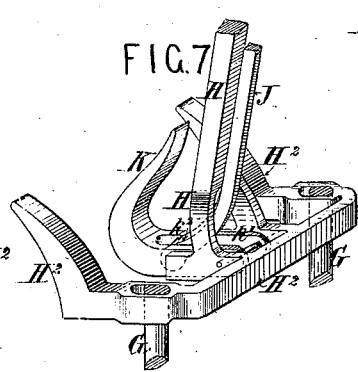
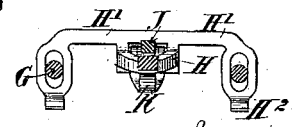
Witnesses
Chas H Smith
J. Staib
Inventors
H. F. Taylor
G. Leyshon
pr Lemuel W. Serrell atty (No Model.) 6 Sheets—Sheet 5.
H. F. TAYLOR & G. LEYSHON.
APPARATUS FOR COATING METAL PLATES.
No. 329,240. Patented Oct. 27, 1885.
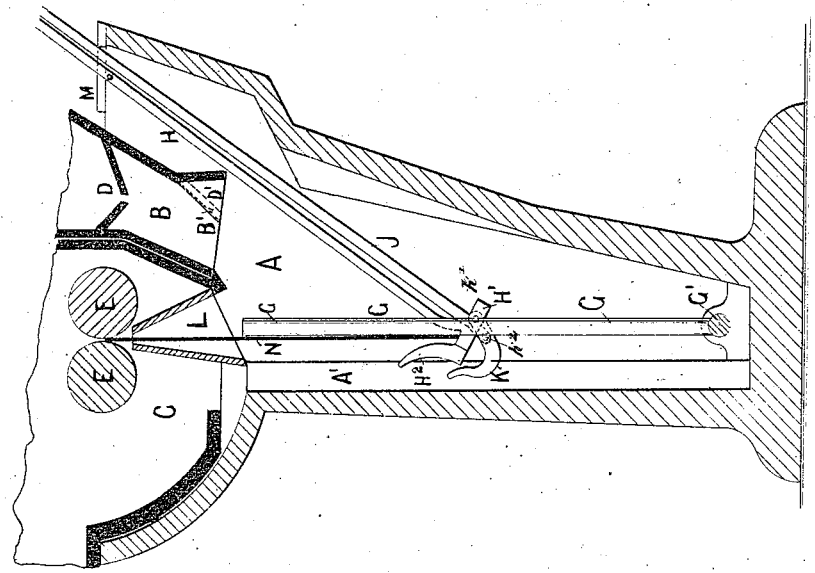
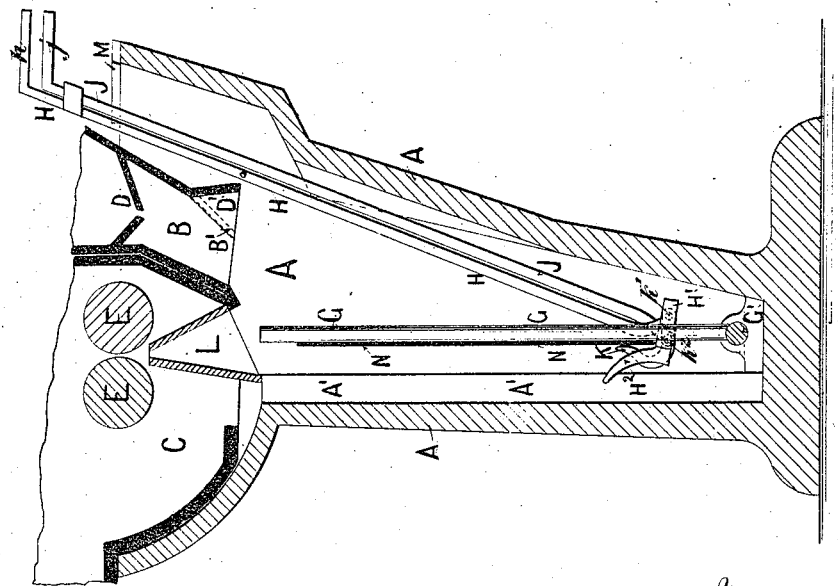
Witnesses
Chas H Smith
J Stail
Inventors
H. F. Taylor
G. Leyshon
per Lemuel W. Serrell
atty (No Model.) 6 Sheets—Sheet 6.

H. F. TAYLOR & G. LEYSHON.
APPARATUS FOR COATING METAL PLATES.

No. 329,240. Patented Oct. 27, 1885.

Witnesses
Chas. H. Smith
J. Stail

Inventor
H. F. Taylor
G. Leyshon
by Lemuel W. Serrell
Atty

UNITED STATES PATENT OFFICE.

HENRY F. TAYLOR, OF NEATH AND BRITON FERRY, COUNTY OF GLAMORGAN, AND GEORGE LEYSHON, OF TIVIDALE, COUNTY OF STAFFORD, ASSIGNORS TO TAYLOR, STRUVÉ, EATON & PRICE, OF NEATH AND BRITON FERRY, SOUTH WALES, ENGLAND.

APPARATUS FOR COATING METAL PLATES.

SPECIFICATION forming part of Letters Patent No. 329,240, dated October 27, 1885.

Application filed August 11, 1883. Serial No. 103,479. (No model.) Patented in England May 4, 1882, No. 2,106, and April 20, 1883, No. 2,012; in France November 3, 1882, No. 151,883, and in Belgium November 8, 1882, No. 59,515.

*To all whom it may concern:*

Be it known that we, HENRY FRANCIS TAYLOR, (of the firm of Taylor, Struvé, Eaton & Price, mechanical engineers,) and GEORGE LEYSHON, tin-house superintendent, subjects of the Queen of Great Britain, residing, respectively, at Neath and Briton Ferry, in the county of Glamorgan, South Wales, and Tividale, in the county of Stafford, England, have invented new and useful Improvements in Apparatus for Coating Metal Plates with Tin, Lead, and other Metals or Alloys of Same, of which the following is a specification.

The chief object of our invention is to perform in one pot the same operations for which it has heretofore generally been necessary to use several pots, generally four or five pots, the said one pot being adapted to contain the required minimum amount of coating metal, and being formed or fitted with the containers for the required materials used for fluxing the uncoated plates and for finishing the coated plates, although we are aware that attempts have been made to accomplish in what might be called one pot what we propose to do, yet these attempts have been made with very complicated machinery. Now, by the use of our invention we produce superior results in the manufacture of tin and terne plates in one pot and, so to say, by one operation, and very materially reduce the cost of production both as to material and labor, also in fuel, in space occupied, and in coating and fluxing material employed.

In order that this our invention may be fully understood, we will proceed to describe an apparatus constructed according to the same.

Figure 2:
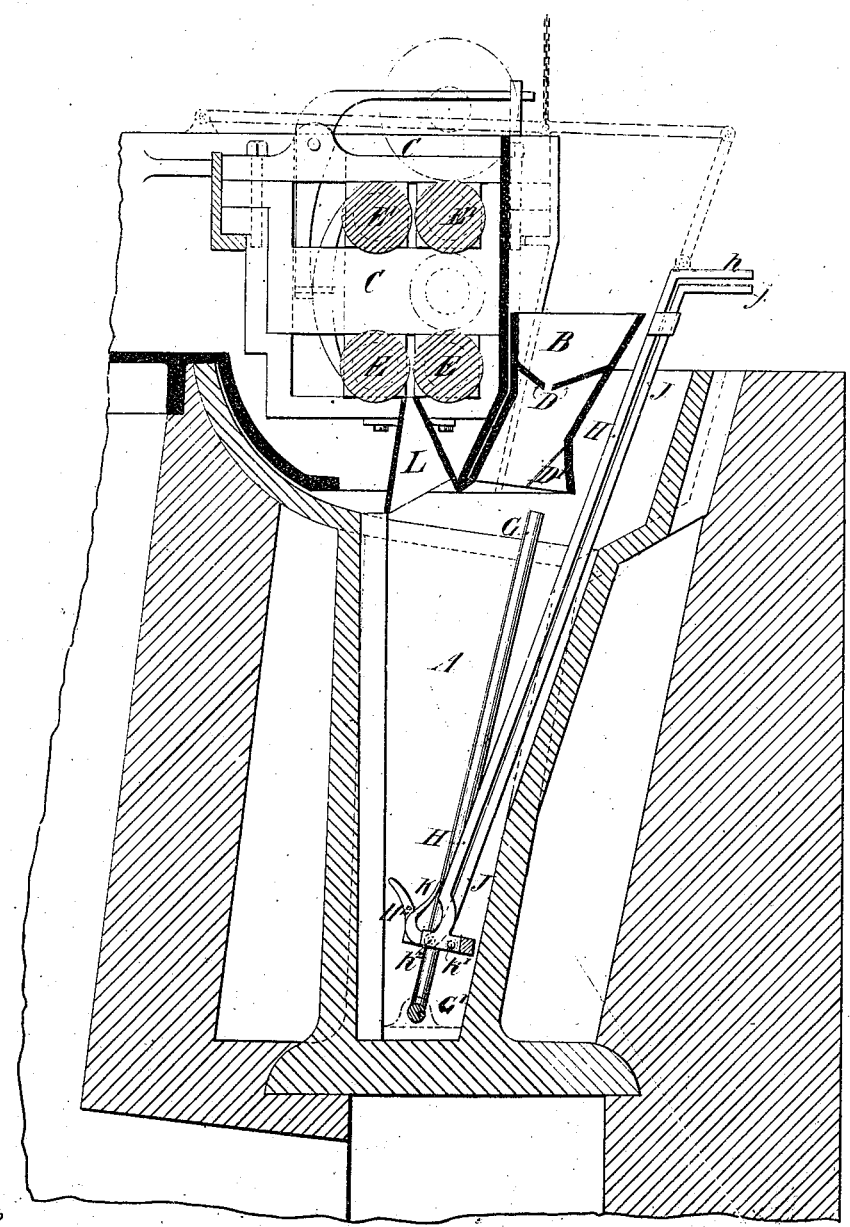
Figure 3:
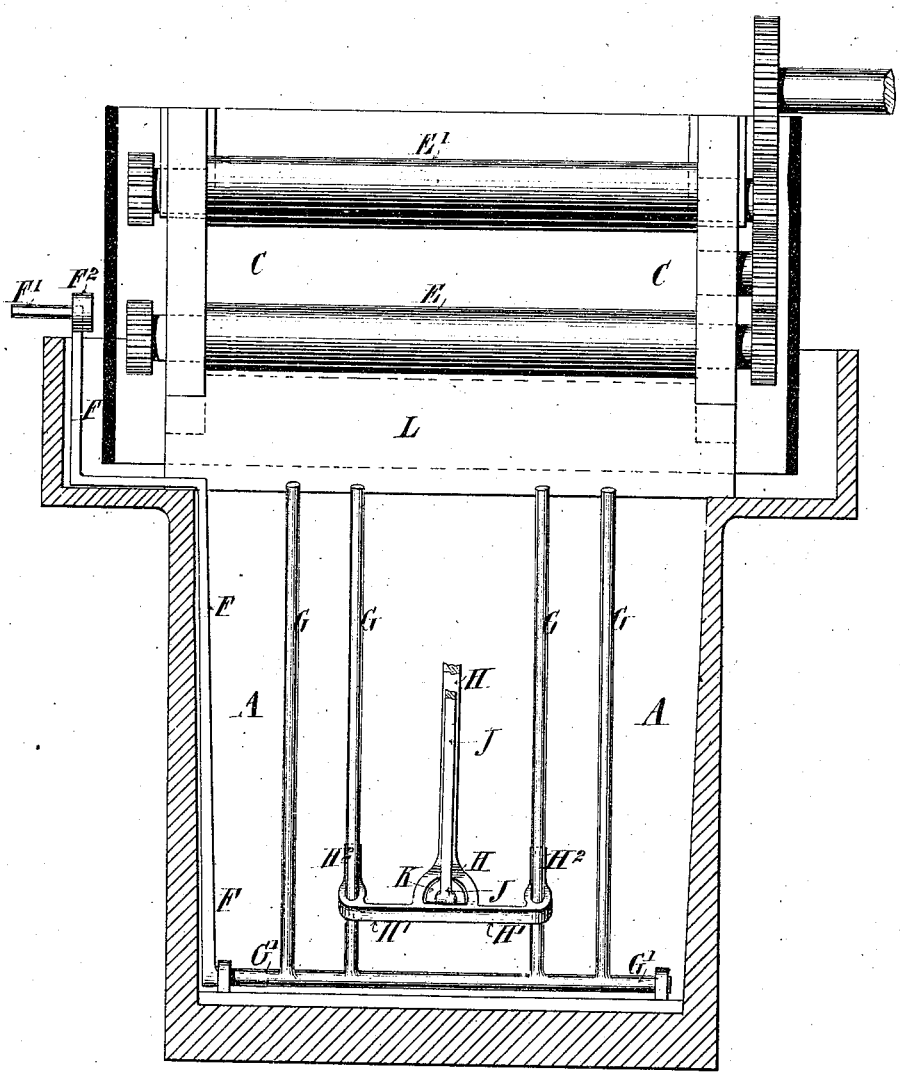
Figure 10:
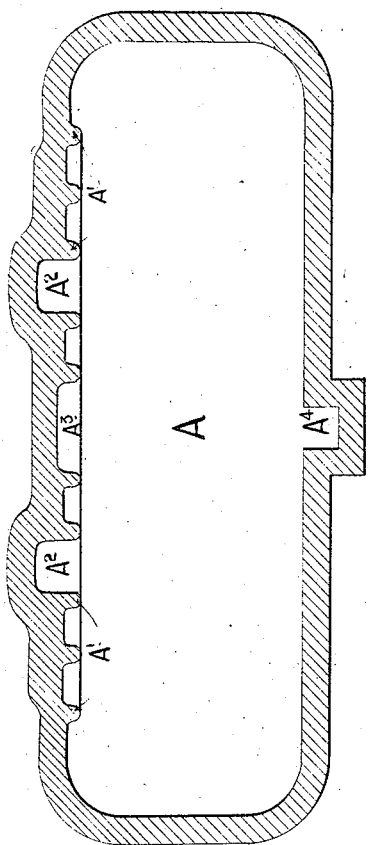

Figure 1 is an end view of the apparatus; Fig. 2, a vertical section through same; Fig. 3, a vertical transverse section, and Fig. 4 a plan. Fig. 5 is a detail front view, and Fig. 6 is a plan of the clipping device, and Fig. 7 shows the clipping device in perspective. Fig. 8 is a diagrammatic section similar to the complete view shown in Fig. 2 of the pot and clip device, but here shown in the position after having received the plate and then canted over. Fig. 9 is a similar view, but showing the plate as lifted through the guide L; and Fig. 10 is a sectional plan of the coating-pot.

Similar letters refer to like parts in all the figures.

According to our invention we place rollers or guides near the top of the pot containing the coating material, between which the plates to be coated are to be passed. When these guides consist of rollers, they are mounted in bearings, and are driven by gearing in opposite or reverse directions to one another.

A is the pot containing the coating material. B is the entrance box or hopper for containing the fluxing material, and C the exit or finishing grease box or hopper.

In carrying our invention into practical effect we have found fixed guides much superior to revolved guide-rollers, as the latter appear to counteract to a certain extent the preparatory action of the flux on the entering uncoated plates, and have other disadvantages.

D D are the guides, which are or may be immersed in the coating material contained in the pot A, and may be carried up to the top of the entrance flux box or hopper B; or, instead of thus continuing them up, we may employ rollers at the upper part of the said flux-box B, for the purpose of guiding and assisting the plate down through the aforesaid lower fixed guides, D, and into the molten metal. Two hoppers, B and C, are provided in the case here shown, or one divided hopper may be used. The first hopper—viz., the entrance flux-box B—contains the flux, consisting of tallow and palm-oil, or other material suitable for fluxing or preparing the plate to take the coating of metal or alloy, such as that hereinafter referred to. The second hopper or finishing-grease box, C, contains the material used for preventing the surface of the metal from oxidizing and for finishing the plate. This material may be tallow, as is now usually employed for such purpose. The uncoated plates, having been prepared in the usual manner by pickling, are introduced one after the other into the first hopper, B, containing the preparatory flux. At the bottom of the hopper the plate is passed through or along the fixed guides D', or, rather, along that part of the guides which is immersed in the molten metal. As stated already, this may, though not so shown here, be assisted by guide-rollers provided in the upper part of the hopper B. The plate is then nipped by a gripping appliance or tongs, H J K, below the fixed guides D D'. The plate is then caught by one end of a weighted lever, and it is canted or pushed over to the under side of the nip of the rollers E, whereby the plate is carried up between same and through the second hopper, C, containing the tallow or finishing-grease or other equivalent material, whereby the metal is prevented from oxidizing and the thickness of the coating on the plates is regulated. The surface thereof is also reduced and consequently improved. When the plate reaches the top of the rollers E', it is removed from the machine by the attendant.

We will now more particularly describe the construction of the clip or gripping-tongs H J K and other interior parts of the apparatus.

G G are four rods fixed on a horizontal spindle, G', which latter can rock in bearings placed at the bottom of the tinning-pot A. On the spindle G' is also fixed a lever, F, provided at its upper end with a handle, F', and a weight, F², for causing a partial revolution of the spindle G' and the consequent canting over of the rods G. The two middle rods, G, serve as guides for the gripping-tongs H J K, which can be raised and lowered thereon, as required, its weight being more or less counterbalanced by the molten metal or alloy. The rod J, for actuating the gripping-finger K, is formed at its upper end as a handle, J, for the workman to grasp in his hands. The hook-shaped gripping-finger is pivoted at K² to the lower end of the rod J, and said gripping-finger is forked and jointed at K' to two lugs on the frame H'. The two lugs are prolonged upward, uniting in a rod, H, the upper end of which is formed as a handle, h, for the workman to grasp in his hand together with the aforesaid handle j. The rods J and H are kept close together by a metal loop on the upper end of rod J. The holes in the frame H' for the rods G to pass through are made as slots, so as to allow for a certain amount of play in the working and canting of the nipping appliance. The frame H' is also provided with horns H², for preventing the plate from leaving it while canting.

By reference to Fig. 10 it will be seen that the lower part of the pot A is somewhat rounded at its ends and provided with ribs A', for the purpose of reducing the frictional surface against which the plate may rub when passing up to the guide L. This latter is arranged in the lower part of the finishing-grease box C, and made box shape or with closed ends. The two ends or horns H² of the frame H' work in the two spaces A², formed in the pot A for the purpose, and the hook or finger K, when released or thrown back, works in the center groove, A³. It will be noticed that the lower part of the pot A is made of such a form as to contain as little molten metal as possible. The right-hand side of the pot is also for this purpose formed wider in one part—that is to say, with a recess at A⁴ for the rods J and H to drop back into, (instead of making the pot of the same width all along.) The entrance-hopper B is at its lower right-hand side formed with a recess, as shown at B', Fig. 9, in dotted lines, for the purpose of giving room for the rods H and J to be raised higher up than shown in case of coating plates of less depth.

E E and E' E' are rolls arranged in the finishing-grease box C, and serving to reduce and finish the coating on the plate.

We do not confine ourselves to the position of the nippers shown here.

The operation is as follows: The workman takes hold of the rod or lever H by the handle h and raises it, together with the parts J and K, against a stop, M, Figs. 8 and 9, so far that the hook or nipping-finger K does not quite reach the surface of the molten metal. He then places the plate N to be coated into the hopper B, containing the flux, (which quickly prepares the plate to receive the coating,) through the guide D, and past the guide D' and into the nip of the tongs—that is to say, between the finger K and the rod H—and by raising the handle j against the handle h, bringing them together in his hand, he thereby causes the bottom part of the plate to be nipped between the hook or finger K and the rod H. He then pushes down the whole appliance, with the plate, along the two middle guide-rods, G, until the top edge of the plate N (all according to its depth or size) is below the bottom edge of the hoppers B and C, and he then lets the handle j go down, whereby the plate is released from the grip of the finger K. Another workman or boy then, by means of the weighted handle F, cants the guide-rods G over to the left, when they will occupy the position shown in Fig. 8, and keeps them in that position. The first workman then lifts the nipping appliance by the handle h, and so brings the plate up through the box-guide L, and causes it to be entered between the lower pair of rolls, E E—namely, into the position shown in Fig. 9. The boy then pushes back or lets go the lever F, which, by the counter-balance of the weight, then falls back into its original position, together with the guide-rods G and the nipping appliance, which is then lifted a little higher (all according to the depth of the plate N) into a position ready to receive a fresh plate. The rolls E carry the finished plate to the next pair or pairs, E', which deliver the plate out of the machine. While the plate with the nipping appliance is being lifted the back or right hand of the frame H'

(see Fig. 2) slides up along the guide-rods G, receding to the right as it descends.

It will be seen from the drawings that the form and arrangement of the guides D and D' in the entrance-hopper B, the nippers G H K J, and the guide L in the finishing-grease box C are such that in case a plate should be put on wrong—that is to say, on the right-hand side, Fig. 2, or back of the guide-rods G while the latter are in a forward or vertical position—then the workman has only to throw the rods G back into the normal position, (shown in Fig. 2,) and the plate can then be taken out by raising the top handle, h, and removing the plate by means of tongs inserted between the entrance-hopper B and the back or right-hand side of the pot A.

The above mode of operation applies to the manufacture of tin plates; but when making terne plates the workman retains the nip of the finger K against the plate N until the latter has been canted over into the position shown in Fig. 8, because the great specific gravity of the terne metal would otherwise float the plate up to the surface before it had been properly coated and before it had been placed in the right position to enter the box-guide L. The weight of the gripping-tongs H J K may, especially for tinning, be balanced by a balance-weight and chain connected to a lever and rod—such, for instance, as by the arrangement shown in dotted lines in Fig. 2. The horns H² hold the plate in position until it is nipped with the finger K. The canting movement of the rods G G may, if desired, be effected automatically by suitable lever-connections to the tongs H J K, so that by the movement of the latter they (the rods) are canted and brought back. As the parts G, H, and K, which are the only parts that come in contact with the plate, never enter the uppermost layer or surface of the molten metal, and, also, as the parts of the rods H and J, which do work through the surface of the molten metal, are placed outside the entrance-hopper B, any scruff or other impurities that may be on the surface of the molten metal cannot be carried down and made to adhere to the plate.

We do not confine ourselves to the position of the nipping appliance shown in the drawings, or to the number of the rollers. The above mode of proceeding, then, consists in passing the plates down through the preparatory-grease box between guides in and through the coating material, and when coated up and between the pressing-rollers and through the finishing-grease contained in the second hopper, and out from the same in a finished coated condition, and all in one pot, and, so to say, by one operation and with only a small quantity of coating metal in the pot, and by the employment of a nipping appliance which never comes to the surface of the coating metal, and whereby the plate is brought into the nip of the pressing-rollers in the exit or finishing-grease box.

In connection with this invention we use in the shallow extrance-hopper B a flux of spirits of salts, prepared in a peculiar manner to be described and claimed in a separate application.

Having now described the nature of our said invention and in what manner the same is to be performed, we declare that we are aware that it has heretofore been proposed to prepare and to coat metal plates in one operation and in a vertical pot, and sometimes with rollers on the exit side in the coating metal and in the flux, the plate having then to be finished in another apparatus—videlicet, a finishing-grease pot.

We are also aware that it has been proposed to prepare and coat and finish metal plates in one operation, and in a pot in which the plate is made to travel in a more or less curvilinear direction from one end of the pot to the other by rollers, chains, or other means.

We do not claim a lifter for raising the plate, as this has been used with entrance and delivery rollers. Neither do we claim a finger to move the plate laterally; nor a cradle to raise the plate up between delivery-rollers. In our improvement the plate is simply guided as it passes down into the coating metal, and it is nipped, and after immersion is raised through the finishing metal and between the pairs of finishing-rollers.

We claim—

1. The combination, in an apparatus for coating and finishing a plate in one operation, of a vertical pot for the molten coating metal, an entrance-hopper therein containing preparatory flux and stationary guides for the plates to be coated, a nipping appliance and cradle which receives the plate to be coated from the said guides, and which is adapted to nip and to lower the plate and hold it while being coated and to raise and release the plate, and operating handles and stops which prevent the nipping part from rising out of the coating metal, and a box on the exit side of the coating-pot, which box contains finishing material and the finishing-rollers, and a box-guide which leads the coated plate into the nip of the finishing-rollers and keeps the rising and floating scruff from the plate, substantially as set forth.

2. The nipping appliance and cradle consisting of the frame H', having handle-rod H, for raising and lowering it, and to which the nipping-finger K, with handle-rod J, is jointed for closing or opening the finger K against the plate, the said frame H' being guided on rods or cradle G, which, with their spindle G', can be rocked or canted in bearings by means of rod F, for the purpose of canting the plate over against the exit side and for bringing the empty cradle back to the entrance side, substantially as set forth.

3. The pot A, for containing coating metal, in combination with the entrance-hopper B, having guides D D', and with a nipping appliance and cradle for lowering, canting, and raising the plate, and with the exit grease-box C, having guide L, with closed ends, and provided with finishing-rollers E, substantially as and for the purposes described.

4. The combination, with the pot A for melted metal, of the guide-rods G, pivoted at G', and lever F for moving the same, the frame H', horns H², and handle J for receiving and raising the plate, and the delivery-rolls E, substantially as specified.

5. The combination, with the pot A for melted metal, of the guide-rods G, pivoted at G', and lever F for moving the same, the frame H', horns H², and handle J, the handle H, and pivoted gripper K, for receiving and raising the plate, and the delivery-rolls E, substantially as specified.

H. F. TAYLOR.
GEO. LEYSHON.

Witnesses:
 S. T. EVANS,
  *South Neath.*
 W. P. NICHOLAS,
*Solicitor's Clerk, Neath, 64 Windsor Road.*